United States Patent
Aumayer et al.

(10) Patent No.: US 7,514,901 B2
(45) Date of Patent: Apr. 7, 2009

(54) METHOD FOR CHARGING A BATTERY

(75) Inventors: Richard Aumayer, Diekholzen (DE);
Christine Ehret, Thalfingen (DE);
Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 786 days.

(21) Appl. No.: 10/729,593

(22) Filed: Dec. 5, 2003

(65) Prior Publication Data
US 2004/0169492 A1    Sep. 2, 2004

(30) Foreign Application Priority Data
Dec. 12, 2002   (DE)   ................. 102 58 337

(51) Int. Cl.
*H02J 7/00* (2006.01)
*H02J 7/04* (2006.01)
*H02P 3/00* (2006.01)

(52) U.S. Cl. .................. 320/125; 320/124; 320/147; 318/536

(58) Field of Classification Search ............ 320/124, 320/125, 147, 160, 150; 318/536
See application file for complete search history.

(56) References Cited

U.S. PATENT DOCUMENTS

| | | | | |
|---|---|---|---|---|
| 5,307,001 A * | 4/1994 | Heavey | ................. | 320/125 |
| 5,594,321 A * | 1/1997 | Kohl et al. | ................. | 361/18 |
| 5,617,005 A | 4/1997 | Brown, Jr. et al. | | |
| 5,623,197 A * | 4/1997 | Roseman et al. | ............. | 320/134 |
| 6,147,473 A * | 11/2000 | Koo | ................. | 320/160 |
| 6,459,243 B1 * | 10/2002 | Cheiky et al. | ................. | 320/155 |
| 6,777,905 B2 * | 8/2004 | Maehara | ................. | 318/650 |
| 2003/0025481 A1 * | 2/2003 | Bertness | ................. | 320/155 |

FOREIGN PATENT DOCUMENTS

| | | |
|---|---|---|
| DE | 3236607 | 4/1984 |
| WO | WO 01/06613 | 1/2001 |

* cited by examiner

*Primary Examiner*—Edward Tso
*Assistant Examiner*—Alexis Boateng
(74) *Attorney, Agent, or Firm*—Kenyon & Kenyon LLP

(57) ABSTRACT

Provided is a method for charging a battery that dynamizes the charging phase of the battery, thereby enabling optimum charging. The dynamization of the charging phase is intended to achieve effective mixing of the battery acid and/or depolarization of the electrodes and ultimately result in improved receiving of the charging current. In this context, the charging method can be carried out according to at least two different methods. In a first method, targeted discharges result in depolarization of the electrodes due to locally decreasing acid density, and in a second method the battery acid is reliably mixed as a result of temporary increasing of the charging voltage via the so-called gassing voltage of the battery. Both methods result in improved battery charging. In an embodiment of the method, the two methods are combined.

31 Claims, 1 Drawing Sheet

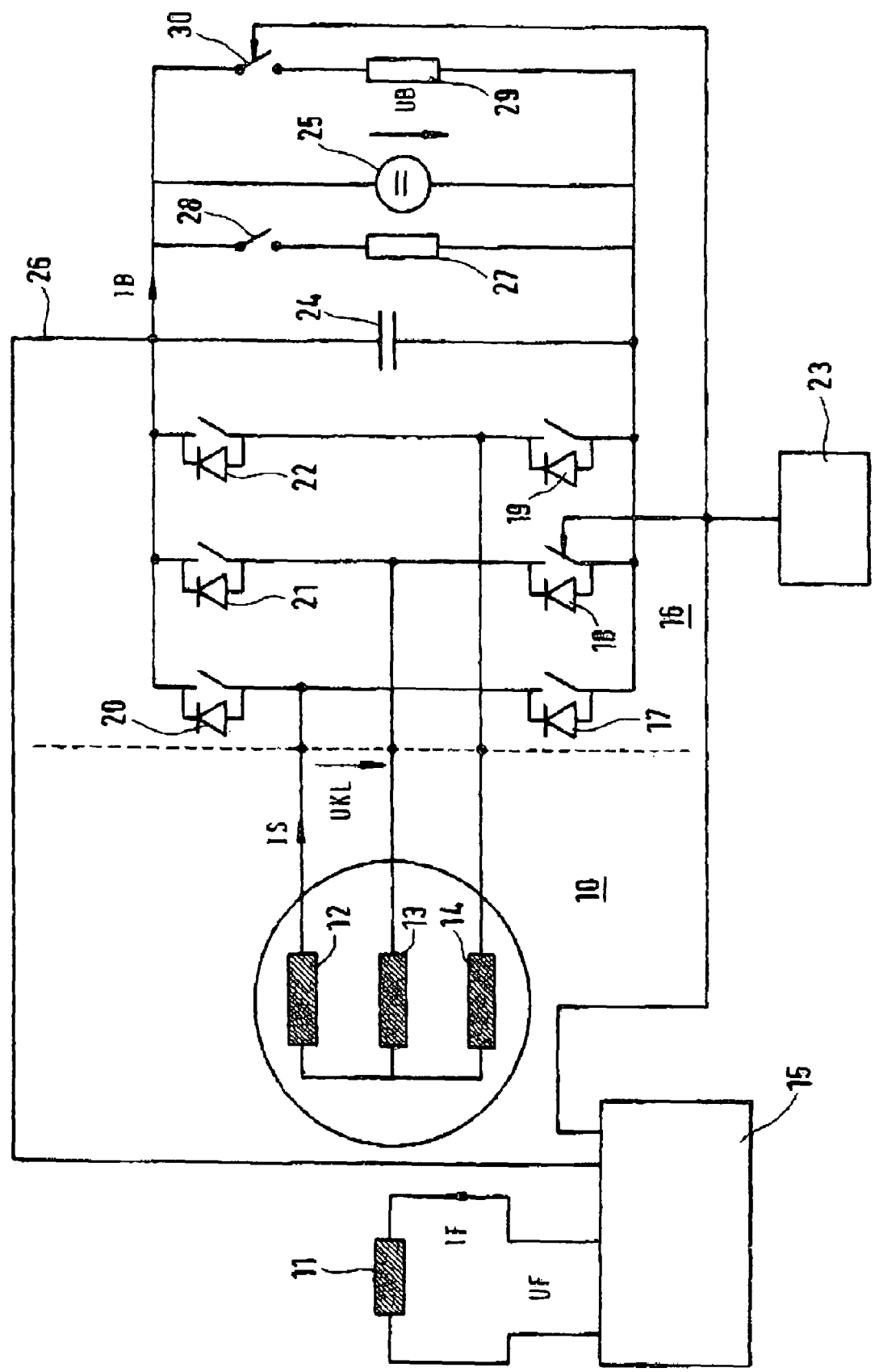

METHOD FOR CHARGING A BATTERY

FIELD OF THE INVENTION

The present invention starts out from a method for charging a battery and relates in particular to the charging of lead-acid batteries in motor vehicles.

BACKGROUND INFORMATION

In the electric system of motor vehicles, the electrical energy needed for the electrical supply is typically produced by generators, their output voltage being regulated to largely constant values in a predefinable manner via a voltage regulator. The battery is typically charged with this approximately constant voltage, the actual charging voltage being set via the voltage regulator such that predefinable parameters are taken into consideration. A voltage regulator that regulates according to a characteristic curve that can be dependent on different parameters, e.g. temperature, is used for this purpose. For regulation, a point is then selected on this characteristic curve, and a control voltage is set accordingly.

The value of the set voltage is restricted at the top to reduce negative effects on the battery as much as possible. In this manner, corrosion and water consumption are to be reduced to the greatest possible extent.

Modern vehicles with diverse current consumers require powerful generators allowing longer battery charging phases already at low engine speeds. In vehicle operation, the output of the generator typically covers the current requirement to the extent that no battery discharge occurs. Particularly powerful generators provide high charging currents already at low engine speeds, thereby resulting in constant battery charging.

However, when charging batteries below the gassing voltage, a concentration polarization of the electrodes results due to the built-up acid with a higher density in the pore structure. This relates to maintenance-free batteries in lead-calcium technology in particular. The counter-voltage of the battery increases as a result of these procedures, and a charging current is no longer received. The higher density acid sinks down within the cell. Since the exchange of acid directly in the pore structure of the plates of the battery with the acid reservoir between the electrodes can only occur via diffusion, exchange processes occur very slowly. The observed acid stratification, which limits the usable capacity of the battery and results in a reduction in the duration of usage time, occurs in the battery particularly in combination with discharges via high currents that mainly discharge the upper electrode portion of the battery electrodes.

SUMMARY OF THE INVENTION

The method according to the present invention is able to prevent the usable capacity from being limited by acid stratification occurring in the battery. This advantage is achieved by dynamizing the charging phase either by forcing discharges or by temporarily increasing the charging voltage. Such discharges are introduced in a suitable manner. For example, a brief discharge is forced in an advantageous manner at regular intervals during a charging phase. The temporary discharge can be achieved either by temporarily switching on consumers, in particular high current consumers, or by interrupting the charging phases at predefinable instants.

The interruption of the charging phases can be advantageously achieved by regularly interrupting the excitation of the generator. For this purpose, the transistor of the voltage regulator, for example, is accordingly controlled such that it is blocked at predefinable instants. The regular interruption of the charging phases allows improved battery charging, i.e., an increase in the usable charge as a result of a reduction in the acid stratification. A charge/discharge frequency in which there is a one-second discharge at least every minute or the charge is interrupted, for example, every 30 seconds for one second proved to be particularly advantageous. The discharge current strength results from the vehicle electric system requirements or can be set via the switching on/off of supplementary consumers.

However, the charging phase can also be dynamized by temporarily exceeding the gassing voltage. The resulting gas causes the acid in the cells of the battery to mix, thereby reducing the acid stratification that results in negative effects.

In this context, it is particularly advantageous that the effective mixing of the battery acid results in a general improvement in the receiving of the charging current, and a more precise determination of the charge state of the battery is also possible via a determination of the acid density. This exactly determinable charge state can be advantageously taken into consideration in subsequent battery management.

In addition, it is advantageous that during dynamization via temporary discharging as well as during dynamization via temporary increasing of the charging voltage and as such of the output voltage of the generator, parameters and boundary conditions can be taken into consideration in such a manner that an optimal battery charge is achieved without disturbing side effects. In this context, corrosion of the battery electrodes is advantageously prevented and water consumption is minimized. If voltage-sensitive consumers are to be taken into consideration, it is advantageously possible to proceed so that a voltage is introduced only when these consumers are switched off or when it is possible to switch them off. In a preferred embodiment the two methods for dynamizing the charging phase are combined so that discharges at predefinable instants or under predefinable conditions and an increase of the charge voltage at predefinable instants or under predefinable conditions are both performed.

BRIEF DESCRIPTION OF THE DRAWING

The FIGURE shows an example of a vehicle electric system having the components of the vehicle electric system important to the present invention.

DETAILED DESCRIPTION

The FIGURE shows a generator as well as the corresponding control circuit for carrying out the method according to the present invention. Generator 10 includes excitation winding 11 and stator windings 12, 13, and 14. Excitation current or field current IF, which is regulated by voltage regulator 15 in a predefinable manner, flows through excitation winding 11. Generator 10 is driven by the crankshaft of the internal combustion engine (not shown) via suitable coupling means and emits a regulated output voltage or output current.

A pulse inverter 16 having pulse inverter elements 17 through 22, which are controlled in a predefinable manner either also by regulator 15 or by an external control device 23 in order to regulate the generator output voltage to desired values, is used for rectifying the current produced in the windings of generator 10. Instead of the pulse inverter, a conventional rectifier having six diodes or Zener diodes is also possible.

A capacitor 24, which is connected to the pulse inverter, is used for temporary storage. The output of generator 10 supplies battery current IB, which is used for charging battery 25.

Current IB is used for supplying the electrical consumers in the electric system. The battery voltage is designated as UB. The battery voltage is supplied to voltage regulator 15 via connection 26 as an actual value. Consumers 27 are activated via switching means 28, which are controlled, for example, by control device 23 in a predefinable manner. Consumers 27 are to symbolize the different electrical consumers in the vehicle electric system. Additional consumers 29 can also be switched on or off via switching means 30. Consumers 29 are the consumers that are activated according to the present invention to dynamize the charging phase, e.g. the rear window defroster.

Using the system represented in the drawing, the charging method according to the present invention can be carried out for battery 25. The necessary control pulses or changeovers are introduced via control device 23, which can be situated at the generator as the electronics. Control device 23 can also be part of the voltage regulator or can be integrated in an electric system or battery management control unit and includes at least one microprocessor, which performs the necessary calculations, suitable accumulators, means via which necessary information can be supplied, as well as means for generating control pulses. To ensure that the disadvantages of battery charging indicated in the "Background Information" section do not occur, control device 23 carries out both charging methods or procedures described in the following:

1. The charging phase is dynamized by exceeding the gassing voltage. In order to prevent acid stratification in the battery, the charging voltage is raised above the gassing voltage of the battery at predefinable instants or conditions. As a result, gas bubbles form in the acid ensuring optimal mixing of the acid in the individual battery cells. A permanent increase in the charging voltage is not possible due to the negative effects on corrosion and water consumption. The frequency of the voltage increase may be adjusted to predefinable conditions and is determined in tests, for example. A voltage increase to 16 volts, for example, in a 12-volt electric system is performed only when the lights are switched off because such a voltage increase could cause the lights to flicker. The described increase in charging voltage generally creates gas bubbles that cause the acid areas with different densities to mix. This counteracts the formation of a higher counter-voltage as well as acid stratification.

The increase in charging voltage is triggered by control device 23, provided that certain conditions are met. The target value for the voltage regulator, for example, is then increased in such a manner that the generator emits a voltage that results in a voltage of, e.g., 16 volts at battery 25. It is also possible in the case of a controlled rectifier bridge to control the pulse inverter elements in such a manner that a voltage above the gassing voltage is temporarily applied to the battery.

The ratio of charging time to overcharging time may be empirically determined for different vehicle electric systems and battery types. For example, a ratio of 2 minutes of charging time and 2 seconds of overcharging time was shown to be advantageous and to eliminate negative effects such as high water consumption and corrosion.

2. In a second charging method, the charging phase is dynamized via targeted discharges. In this context, a brief discharge is forced during a charging phase at regular intervals. This occurs, for example, by activating a strong consumer, e.g. the rear window defroster. Corresponding switch 30 of consumer 29 is closed temporarily by supplying a control signal. However, discharging of battery 25 can also be achieved by interrupting the excitation of the generator or by de-excitation. For this purpose, regulator 15 or control device 23 influences excitation current IE via excitation winding 11 in such a manner that it returns to a minimum value. For example, the excitation current is influenced or regulated such that it is reduced to zero for one second every 20 to 30 seconds, this influencing of the excitation current being performed in addition to the usual regulation of the excitation current.

A discharge pulse results in a depolarization of the electrodes since the acid density decreases locally, thus temporarily resulting in improved receiving of the charging current. The frequency and the discharge current strength at which optimal mixing occurs can be determined on a battery-specific basis via tests, for example. Values, for example, of 1 minute of charging and 12 seconds of discharging have good results. Such a dynamization of the charging phases allows a vertical stratification of the acid density with short diffusion distances. Such a method can also be used in laboratory charging. The reduction in concentration polarization results in improved receiving of the charging current as compared to conventional systems.

A targeted de-excitation of the generator may also be used to generate a discharge pulse. For this purpose, voltage regulator 15 switches off the excitation current at predefinable instants and/or under predefinable conditions.

The two above-described charging methods may also be combined in a suitable manner. Two methods for depolarizing the electrodes are then used simultaneously, and acid stratification can be reliably prevented. The proportion of use of the two methods may be adapted to the specific battery and is to be determined, for example, by evaluating tests.

In the case of a voltage increase that affects the entire electric system, the luminous intensity of the headlights is also influenced. In this case, the voltage increase should only be performed when the main headlights are switched off. In countries requiring fundamental use of headlights when the vehicle is in operation or under conditions that require long-term headlight use, an additional light sensor may be used, the dynamized charging via voltage increase then only being performed during the day since fluctuations in the luminous intensity of the headlights are not particularly noticeable in the daylight.

In the case of a generator having a controlled rectifier bridge, e.g. a bridge with pulse inverters, the voltage may be regulated via the controlled bridge as well as by influencing the excitation current. In the case of a generator having a diode bridge, this may be achieved only by influencing the excitation current and as such the magnitude of the output voltage of the generator.

The charging method is carried out in such a manner that negative effects on specific values are prevented, predefinable priorities being taken into consideration in the selection of the methods. The charging voltage is only increased under predefinable conditions, in particular, only when no voltage-critical consumers are switched on or when such consumers can be switched off prior to the voltage increase.

The described methods for charging a battery are usually carried out in a vehicle electric system having a generator including a voltage regulator and a battery for supplying the electric system consumers as well as control means that allow the methods to be carried out.

What is claimed is:

1. A method for charging a battery having a control device that influences a charging current for the battery in a predefined manner and carries out at least two different charging methods, the method comprising:

in a first charging process, maintaining a substantially constant voltage;

in a second charging process, taking measures resulting in dynamization; and
in the second charging process, forcing discharges at predefined instants by one of switching on a predefined consumer and de-exciting a charging device.

2. The method according to claim 1, wherein the battery is a lead-acid battery in a motor vehicle that is charged via a generator that is regulated to predefined voltages via a voltage regulator.

3. The method according to claim 1, wherein the consumer is a window heater.

4. The method according to claim 1, wherein the charging device is de-excited during charging phases.

5. The method according to claim 1, further comprising increasing a charging voltage with respect to a usual value in the second charging process.

6. The method according to claim 5, wherein the charging voltage is increased to about 16 volts.

7. The method according to claim 5, wherein the charging voltage is increased via corresponding controlling by a voltage regulator, which provides an increased target voltage value for regulating an output voltage.

8. The method according to claim 5, wherein the charging voltage is influenced in the case of a generator having a controlled rectifier bridge by activating pulse inverter elements of a rectifier bridge.

9. The method according to claim 1, wherein the charging device is de-excited such that an excitation current is interrupted in each case after a predefined first time for a second time, the first time being in a range of 20 to 60 seconds and the second time being about one second.

10. The method according to claim 9, wherein the charging device is de-excited via corresponding controlling of a regulating transistor of a voltage regulator.

11. A method for charging a battery having a control device that influences a charging current for the battery in a predefined manner and carries out at least two different charging processes, the method comprising:
in a first charging process, maintaining a substantially constant voltage;
in a second charging process, taking measures resulting in dynamization;
in the second charging process, forcing discharges at predefined instants by one of switching on a consumer and de-exciting a charging device; and increasing a charging voltage with respect to a usual value at predefined instants.

12. A method for charging a battery having a control device that influences a charging current for the battery in a predefined manner and carries out at least two different charging processes, the method comprising:
in a first charging process, maintaining a substantially constant voltage;
in a second charging process, taking measures resulting in dynamization; and
increasing a charging voltage only when one of (a) no voltage-critical consumers are switched on and (b) voltage-critical consumers are switched off prior to an increase in voltage.

13. The method according to claim 1, wherein negative effects on specific values are prevented, and predefined priorities are taken into consideration when selecting the first charging process and the second charging processes.

14. A device for charging a battery comprising:
a maintaining arrangement for maintaining a substantially constant voltage in a first charging process and a second arrangement for taking measures resulting in dynamization in a second charging process method; and
wherein the second charging process includes forcing discharges at predefined instants by one of switching on a predefined consumer and de-exciting a charging device.

15. The device according to claim 14, wherein the battery is a lead-acid battery in a motor vehicle that is charged via a generator that is regulated to predefined voltages via a voltage regulator.

16. The device according to claim 14, wherein the consumer is a window heater.

17. The device according to claim 14, wherein the charging device is de-excited during charging phases.

18. The device according to claim 14, further comprising:
increasing a charging voltage with respect to a usual value in the second charging process.

19. The device according to claim 18, wherein the charging voltage is increased to about 16 volts.

20. The device according to claim 18, wherein the charging voltage is increased via corresponding controlling by a voltage regulator, which provides an increased target voltage value for regulating an output voltage.

21. The device according to claim 18, wherein the charging voltage is influenced in the case of a generator having a controlled rectifier bridge by activating pulse inverter elements of a rectifier bridge.

22. The device according to claim 14, wherein the charging device is de-excited such that an excitation current is interrupted in each case after a predefined first time for a second time, the first time being in a range of 20 to 60 seconds and the second time being about one second.

23. The device according to claim 22, wherein the charging device is de-excited by controlling a regulating transistor of a voltage regulator.

24. The device according to claim 14, wherein the battery is a lead-acid battery in a motor vehicle that is charged via a generator that is regulated to predefined voltages via a voltage regulator.

25. The device according to claim 14, wherein:
a charging voltage is increased with respect to a usual value in the second charging process,
the consumer is a window heater,
the charging device is de-excited during charging phases, and
the charging voltage is increased by controlling a voltage regulator, which provides an increased target voltage value for regulating an output voltage.

26. The device according to claim 18, wherein the charging voltage is influenced in the case of a generator having a controlled rectifier bridge by activating pulse inverter elements of a rectifier bridge, and wherein the charging device is de-excited such that an excitation current is interrupted in each case after a predefined first time for a second time, the first time being in a range of 20 to 60 seconds and the second time being about one second.

27. The device according to claim 26, wherein the charging device is de-excited by controlling a regulating transistor of a voltage regulator.

28. The device according to claim 14, wherein negative effects on specific values are prevented, and predefined priorities are taken into consideration when selecting the first charging process and the second charging process.

29. The method according to claim 1, further comprising: increasing a charging voltage with respect to a usual value in the second charging process;
wherein the consumer is a window heater, wherein the charging device is de-excited during charging phases, and wherein the charging voltage is increased by controlling a voltage regulator, which provides an increased target voltage value for regulating an output voltage.

30. The method according to claim 29, wherein the charging voltage is influenced in the case of a generator having a controlled rectifier bridge by activating pulse inverter elements of a rectifier bridge, and wherein the charging device is de-excited such that an excitation current is interrupted in each case after a predefined first time for a second time, the first time being in a range of 20 to 60 seconds and the second time being about one second.

31. The method according to claim 30, wherein the charging device is de-excited by controlling a regulating transistor of a voltage regulator.

* * * * *